United States Patent [19]
Iwao

[11] Patent Number: 5,334,096
[45] Date of Patent: Aug. 2, 1994

[54] UNIFORM MOTION TYPE UNIVERSAL JOINT WITH NO GENERATION OF HIGH FREQUENCY VIBRATING COMPONENT

[75] Inventor: Keijiro Iwao, Yokosuka, Japan

[73] Assignee: Nissan Motor Co., Ltd., Yokohama, Japan

[21] Appl. No.: 822,955

[22] Filed: Jan. 21, 1992

[30] Foreign Application Priority Data

Jan. 21, 1991 [JP] Japan ................... 3-005109

[51] Int. Cl.$^5$ ........................... F16D 3/227
[52] U.S. Cl. .................. 464/146; 310/326; 464/906
[58] Field of Search ............ 464/29, 139, 141–146, 464/906, 111, 905; 73/668; 310/51, 317, 326; 384/1

[56] References Cited

U.S. PATENT DOCUMENTS

| | | | |
|---|---|---|---|
| 3,817,057 | 6/1974 | Orain | 464/111 X |
| 4,511,346 | 4/1985 | Hazebrook et al. | 464/146 |
| 4,626,730 | 12/1986 | Hubbard, Jr. | 310/317 X |
| 4,729,459 | 3/1988 | Inagaki et al. | 310/317 X |
| 5,097,171 | 3/1992 | Matsunaga et al. | 310/317 X |

FOREIGN PATENT DOCUMENTS

| | | | |
|---|---|---|---|
| 62-251525 | 11/1987 | Japan | 464/143 |
| 63-92822 | 4/1988 | Japan | 464/141 |
| 1-188719 | 7/1989 | Japan | 464/146 |
| 3-61720 | 3/1991 | Japan | 464/146 |
| 2115521 | 9/1983 | United Kingdom | 464/141 |

OTHER PUBLICATIONS

Marui et al, Japan Mechanics Society vol. C 49 No. 443, pp. 1146–1152, Jul., 1983.

Primary Examiner—Daniel P. Stodola
Assistant Examiner—Eileen A. Dunn
Attorney, Agent, or Firm—Foley & Lardner

[57] ABSTRACT

In a mechanical element such as a uniform velocity type universal joint having an inner joint member and one of a plurality of spherical ball elements or an outer joint member and one of the spherical ball elements, the ball rolls and slides on the surface of either or both of the inner and outer joint members thus generating relative harmonic vibrations due to a frictional force generated thereon by the sliding contact between the ball and the joint members. To reduce high-frequency harmonic vibrations, a pair of piezoelectric actuators are installed between a flange of one rotation axle of the (constant) uniform velocity type universal joint and the outer joint member and/or between a mounting bolt head of the universal joint and the outer joint member. The piezoelectric actuators expand and constrict at a phase different from that of an input vibrating force acting upon and between the inner joint member and each spherical ball element or at a frequency different from a rotation frequency of the universal joint.

11 Claims, 11 Drawing Sheets $Va = Vo - \upsilon \sin(\omega t + \theta_1)$ $Vb = Vo - \upsilon \sin(\omega t + \theta_1)$

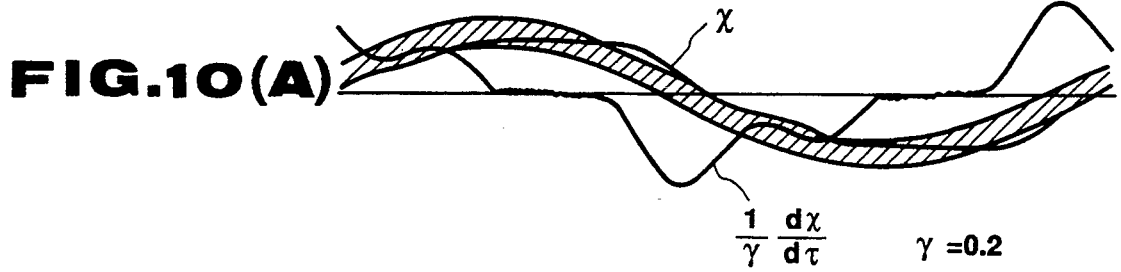
FIG.10(A) $\frac{1}{\gamma}\frac{d\chi}{d\tau}$  $\gamma=0.2$
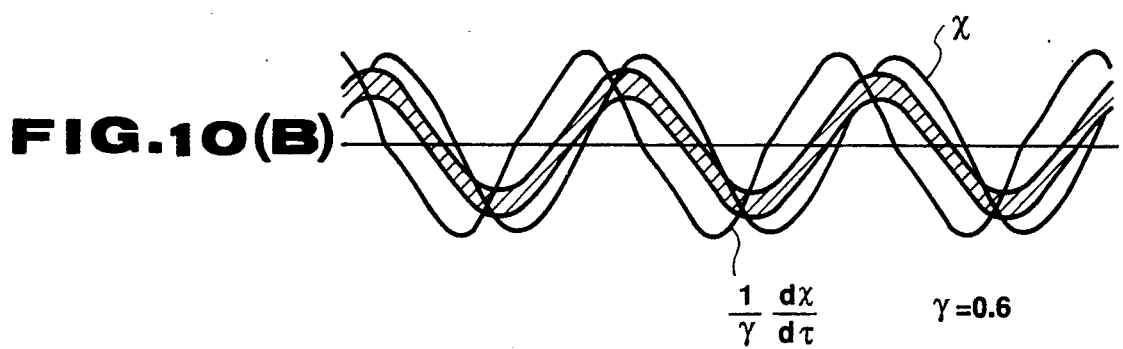
FIG.10(B) $\frac{1}{\gamma}\frac{d\chi}{d\tau}$  $\gamma=0.6$
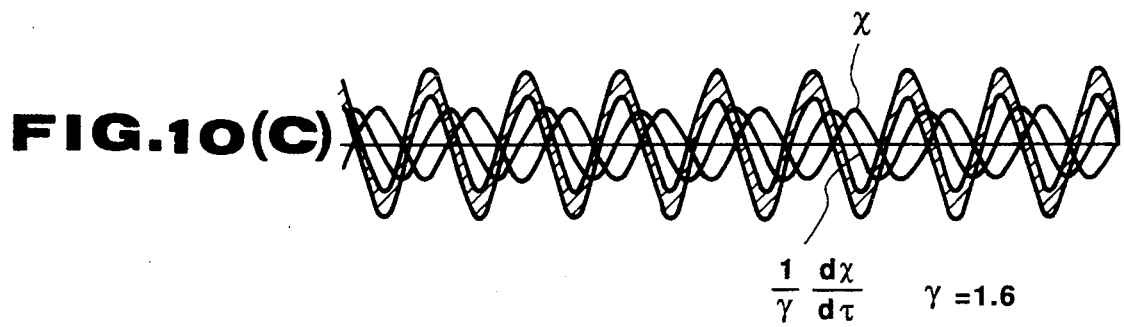
FIG.10(C) $\frac{1}{\gamma}\frac{d\chi}{d\tau}$  $\gamma=1.6$

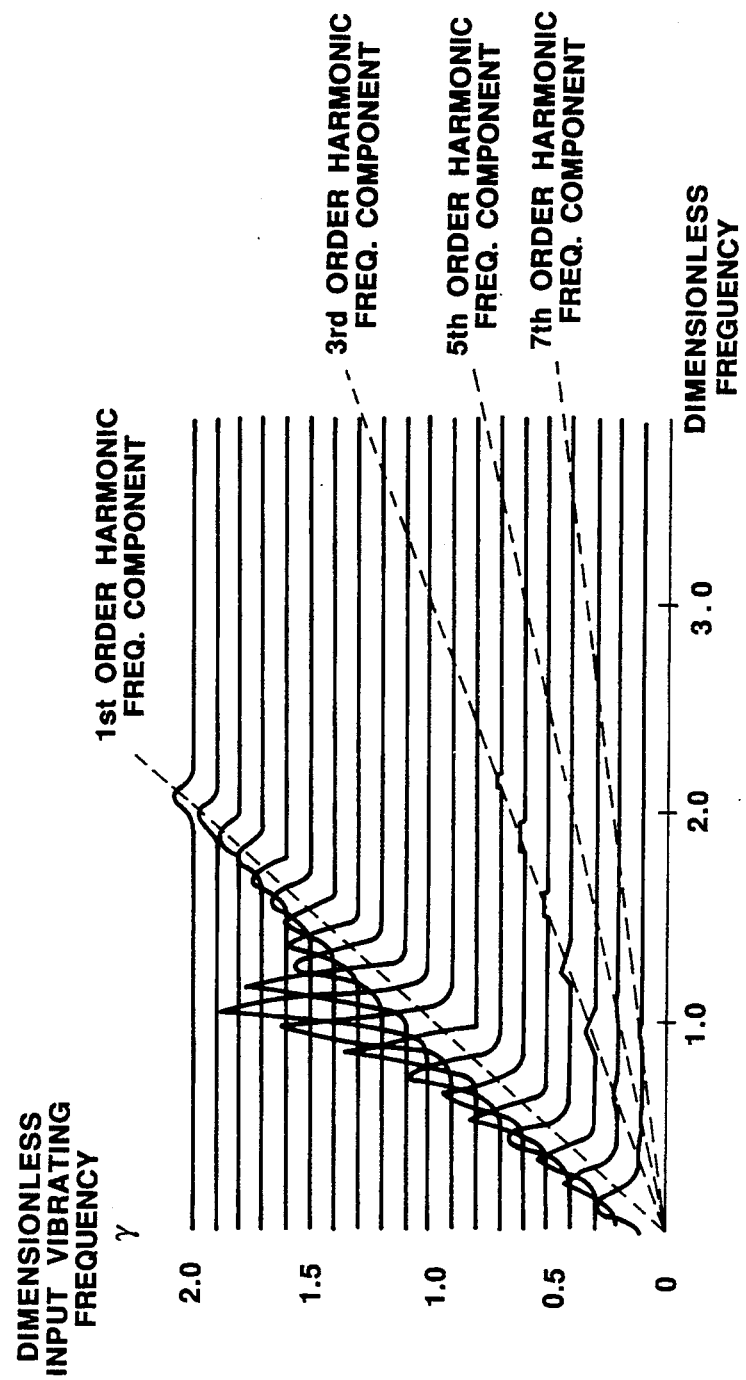

UNIFORM MOTION TYPE UNIVERSAL JOINT WITH NO GENERATION OF HIGH FREQUENCY VIBRATING COMPONENT

BACKGROUND OF THE INVENTION (1) Field of the Invention

The present invention relates generally to a mechanical element having a pair of cooperative members, such as an outer member and a ball and such as an inner member and the ball of a uniform motion type universal joint constructed so as to relatively generate a harmonic vibration between the pair of members along with a sliding motion of one of the pair of members therebetween.

The present invention relates especially to the structure of the mechanical element described above in which a high frequency vibration is caused by the relative vibration due to a relative sliding motion between the pair of members.

(2) Description of the Background Art

FIG. 1 shows a cross sectional view of a conventional uniform motion type universal joint. The universal joint 1 shown in FIG. 1 serves to connect both rotational axles 2 and 3, respectively. The universal joint 1 serves to permit a transmission of an uniform velocity and a smooth rotary motion between the rotation axles 2 and 3, irrespective of a joint angle formed therebetween.

A structure of the uniform motion type universal joint will briefly be explained with reference to FIG. 1.

As shown in FIG. 1, a flange 2a is engaged with one end of one of the rotation axles 2. A ring shaped outer member 5 is coaxially fixed by means of a mounting bolt 4. An inner peripheral surface of the outer member 5 is formed with a plurality of ball rolling grooves 6 along its axial direction.

In addition, a ring shaped inner member 7 is axially engaged with one end of the other rotation axle 3 as shown in FIG. 1 so as to be enclosed with the outer member 5. An outer peripheral surface of the inner member 7 is formed so that the plurality of elongated ball running grooves 8 along the axial direction of the inner member 7 are opposed to the ball rolling groove 6 of the outer member 5.

Furthermore, a plurality of balls 10 are intervened between the outer member 5 and inner member 7 so as to be accommodated within the ball rolling grooves 6 and 8 and so as to be held by means of a ring shaped cage 9.

An action of a torque transmission between rotation axles 2 and 3 during a flexing of the uniform motion type universal joint 1 will be explained with reference to FIG. 2.

At first, suppose that one rotational axle 2 is a drive axle and the other rotational axle 3 is a driven axle.

Suppose that both rotational axle 2 and outer member 5 are rotated by a rotational speed ω input and the rotational force is transmitted toward the rotational axle 3 side via the uniform motion type universal joint 1 so that both inner member 7 and rotational axle 3 are rotated by a rotational speed ω output.

In addition, one of the balls 10 (hereinafter simply referred to as the ball) makes contact with the outer member 5 at a point a at an arbitrary time and makes contact with the inner wheel 7 at a point b also makes contact with the outer member 5 at a point a' and with the inner member 7 at a point b' after the uniform type universal joint 1 is further rotated through 90 degrees.

At this time, the ball 10 shown in FIG. 2 is always present at a position a distance R from a center axis of the outer member 5. A distance $r_1$ from the center of the ball 10 to the contacts a, a' is constant. In addition, similarly, the ball 10 is always present at a position a distance R from the center axis of the inner member 7. A distance $r_2$ from the center of the ball 10 to the contacts b, b' is constant as well.

Furthermore, suppose that an advance angle of the ball 10 after the uniform motion type universal joint 1 has been rotated by 90 degrees is $\theta'$ and the advance angle of the inner member 7 with respect to the ball 10 is $\theta''$.

$$\theta = \theta' + \theta'' \tag{1}$$

If the uniform motion type universal joint 1 has a function as, so called, the uniform motion type universal joint, the following formula should be established:

$$\omega \text{ input} = \omega \text{ output} \tag{2}$$

If the equation (2) is satisfied and a uniform motion of the uniform motion type universal joint 1 is secured, $$\theta' = \theta'' \tag{3}$$

That is to say, the following equation represents a necessary and sufficient condition for an ideal uniform velocity and rotary motion:

$$\theta' = \theta'' = \theta/2 \tag{4}$$

Suppose there is a relative motion relationship between the outer member 5 and the ball 10 and/or between the inner member 7 and ball 10 in the conventional uniform type universal joint 1.

That is to say, suppose during the 90 degree rotation of the uniform motion type universal joint 1, a rotational angle through which the ball 10 is rolled is $\phi$, a movement distance of the ball 10 (a distance between a−a') with respect to the outer member 5 is $L_1$, a movement distance of the ball 10 (a distance between b−b') with respect to the inner member 7 is $L_2$, and that the ball 10 is rolled on conditions that the ball 10 takes no smooth roll over both outer member 5 and inner member 7. If this supposition is correct, the following relationship should be established:

$$L_1 = L_2 \tag{5}$$

From the above equation (5), the following equation (6) is also established:

$$r_1 \cdot \phi = r_2 \cdot (\phi + \theta) \tag{6}$$

Therefore, the following equation (7) needs to be established:

$$(r_2 - r_1) \cdot \phi + r_2 \cdot \theta = 0$$

The following equation (8) is a necessary condition if the equation (7) is always established for an arbitrary rotational angle $\phi$.

$$r_1 = r_2, \; r_2 = 0 \tag{8}$$

However, as a practical matter of fact, the equation (8) is not satisfied. Hence, there is an inconsistency in the above-described supposition, i.e., that the ball 10 shown in FIG. 2 is completely rolled over the outer member 5 and inner member 7 with no slide motion thereof.

This indicates that the ball 10 does not actually make a perfect rolling motion against the outer member 5 and inner member 7 but makes an imperfect rolling motion simultaneously with a slide motion.

As appreciated from the above, in the conventional uniform type universal joint 1, it is clear that the ball 10 makes not only a rolling motion against the outer member 5 and inner member 7 but also makes a slide motion against them and consequently, a vibration force due to the friction on a sliding portion of the respective members is imposed in a rotation axis direction.

How a vibration system to which the vibration force is applied responds to the input vibration force will be explained with reference to FIG. 6 which is a simple model showing a relationship of the torque transmission between the outer member 5 and ball 10 in the uniform motion type universal joint 1 (although the similar model is established between the inner member 7 and ball 10, it is omitted herein).

The following explanation refers to pages 1146 to 1152 of Japanese report "Japan Mechanics Society Volume C 49 No. 443".

FIG. 3 shows a vibration model of one degree of freedom representing the mechanical element shown in FIG. 1.

As shown in FIG. 3, suppose a one-degree of freedom vibration model has a mass M, a rigidity K of spring mass system, and an attenuation factor C. In addition, suppose a system in which a frictional force F which is dependent on a velocity dX/dt as shown in FIG. 7 is applied to the mass M of the system.

Suppose, furthermore, that a displacement vibration force Y is applied to the system;

$$Y = A \cdot \sin(\omega t) \quad (9)$$

It is noted that a reason that the displacement vibration force Y is a sinusodial wave is based on the fact that when, supposing the outer member 5 is fixed, the ball 10 takes one reciprocating motion within the ball rolling groove 6 of the outer member 5 during one rotation of the uniform type universal joint 1. That is to say, both outer member 5 and ball 10 constitute the mechanical element such that a relative harmonic vibration takes place along with the slide motion of the ball 10 on the outer member 5.

An equation of motion in the vibration system is expressed as follows:

$$M \cdot d^2X/dt^2 = -C(dX/dt - dY/dt) - K(X - Y) - F \cdot \text{sgn}(dX/dt) \quad (10)$$

In the equation (10), the following substitutions are carried out to be subjected to dimension-less equation:
$K/M = \omega_n^2$,
$C/M = 2\xi\omega_n$,
$X/A = x$,
$\omega/\omega_n = \gamma$,
$\omega_n t = \gamma$, and,
$F/KA = f$.
Then, since $$dx/dt = \omega_n(dx/d\tau) \quad (11)$$

the equation (10) can be rearranged as follows:

$$d^2x/d\tau^2 + 2\xi dx/d\tau + x + f \cdot \text{sgn}(dx/d\tau) = 2\xi\gamma \cdot \cos(\gamma\tau) + \sin(\gamma\tau) \quad (12)$$

In this way, the dimension-less equation of motion can be derived which is determined by three parameters; an attenuation ratio $\xi$, a dimension-less input vibration frequency $\gamma$ which is a ratio between an input vibration frequency $\omega$ and an inherent natural frequency $\omega_n$, and a dimension-less frictional force f which is a ratio between a frictional force F and displacement input vibration force KA.

FIG. 8 shows a result of simulation for the equation of motion according to the equation (12) executed using a Runge-Kutta method.

As shown in FIG. 8, it is estimated that a dimension-less displacement x corresponding to a displacement of the mass M is affected by a high vibration frequency component which is not included in the input, i.e., displacement vibrating input since the frictional force F is present although the displacement input vibration force Y is sinusodial wave.

FIG. 9 shows a result of simulation executed in terms of frequency analysis in a case when the attenuation ratio $\xi$ and dimension-less frictional force f are fixed as follows:
$\xi = 0.1$; and
$f = 0.2$;
and the dimension-less input vibration frequency $\gamma$ is set as follows: $\gamma = 0.2$, that is to say, in a case where a rigidity in a vicinity to a portion at which the frictional force is generated is high.

As appreciated from a power spectrum shown in FIG. 9, it is confirmed that the vibration system shown in FIG. 3 generates high frequency vibrations (in the example shown in FIG. 3, the dimension-less frequencies over 0.6 as depicted in FIG. 9) which are different from the dimension-less input vibration frequency (in the example shown in FIG. 3, the dimension-less frequency of 0.2 as shown in FIG. 9).

As appreciated from the above observations, in the conventional uniform motion type universal joint 1, the ball 10 rolls and slides over the outer member 5 and inner member 7 and, therefore, high frequency vibrations due to the frictional force generated thereon provide a source of noise for a portion of such joints.

It is noted that such a problem as described above can be applied equally well to all systems represented by the model shown in FIG. 3, i.e., all mechanical elements having a pair of cooperative members which relatively and harmonically vibrate together due to the sliding motion therebetween.

SUMMARY OF THE INVENTION

It is, therefore, an object of the present invention to provide an improved mechanical element having a pair of cooperative members which carry out a relative harmonic vibration along with a slide motion such as a uniform motion type universal joint having a ball, an inner member, and an outer member.

It is another object of the present invention to provide an improved mechanical element which can suppress a generation of high frequency vibration components caused by a frictional force of a sliding portion thereof.

The above-described objects can be achieved by providing a mechanical element, comprising: a) a pair of cooperative members adapted for being relatively slided on one of the pair of cooperative members and for being relatively harmonically vibrated together in response to an external vibrating force causing the relative harmonic vibration to the pair of cooperative members; and b) means for providing a displacement variation for a portion of one of the pair of cooperative members contacting the other of the pair of cooperative members in a direction of the external vibrating force so that a phase of the displacement variation is at least different from that of the harmonic vibration generated due to the external vibrating force.

The above-described objects can also be achieved by providing an uniform motion type universal joint yoke, comprising: a) an outer member installed on one of rotation axles and having a plurality of ball rolling grooves on its outer peripheral surface; b) an inner wheel installed on the other rotation axle and having a plurality of ball rolling grooves on its inner peripheral surface; c) a plurality of balls disposed in the ball rolling grooves of the outer and inner members for transmitting a torque between the inner and outer members; d) a cage adapted for holding the ball; and e) means for applying a displacement variation to at least one of the inner or outer member so that a phase of the displacement variation is at least different from a phase of the vibrating force acted upon at least one of between each ball and outer member or between each ball and inner member.

The above-described object can also be achieved by providing an uniform motion type universal joint yoke, comprising: a) an outer member installed on one of rotational axles and having a plurality of ball rolling grooves on its outer peripheral surface; b) an inner member installed on the other rotational axle and having a plurality of ball rolling grooves on its inner peripheral surface; c) a plurality of balls disposed in the ball rolling grooves of the outer and inner members for transmitting a torque between the inner and outer members; d) a cage adapted for holding the ball; and e) means for applying a displacement variation to at least one of the inner or outer member at a frequency of the displacement variation which is different from that of the vibrating force acted upon at least one of between each ball and the outer wheel or between each ball and inner member.

BRIEF DESCRIPTION OF THE DRAWINGS

FIGS. 10(A), 10(B) and 10(C) are waveform charts representing responsive characteristics to velocity and displacement in a plurality of input frequencies as the result of simulation by a Runge-Kutta method on the basis of the equation of motion represented by equation (12).

FIG. 11 is a characteristic graph representing a frequency distribution of responded waveforms in the plurality of input frequencies as the result of simulation carried out on the basis of the equation of motion represented by the equation (12).

DETAILED DESCRIPTION OF THE PREFERRED EMBODIMENT

Reference will hereinafter be made to the drawings in order to facilitate a better understanding of the present invention.

Figure 1:
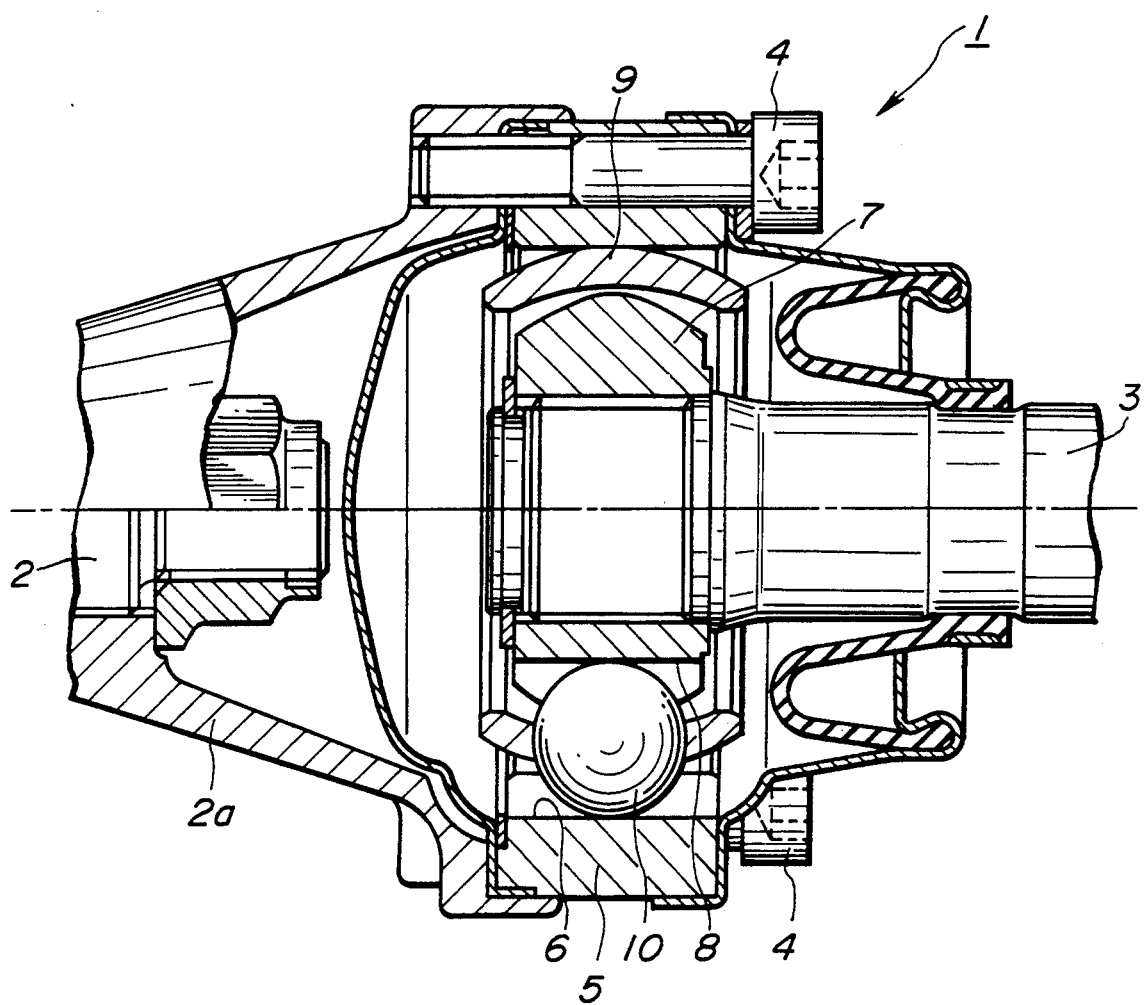
FIG. 1 is a cross-sectional view of an essential part of a conventional uniform motion type universal joint described in the BACKGROUND OF THE INVENTION.
Figure 2:
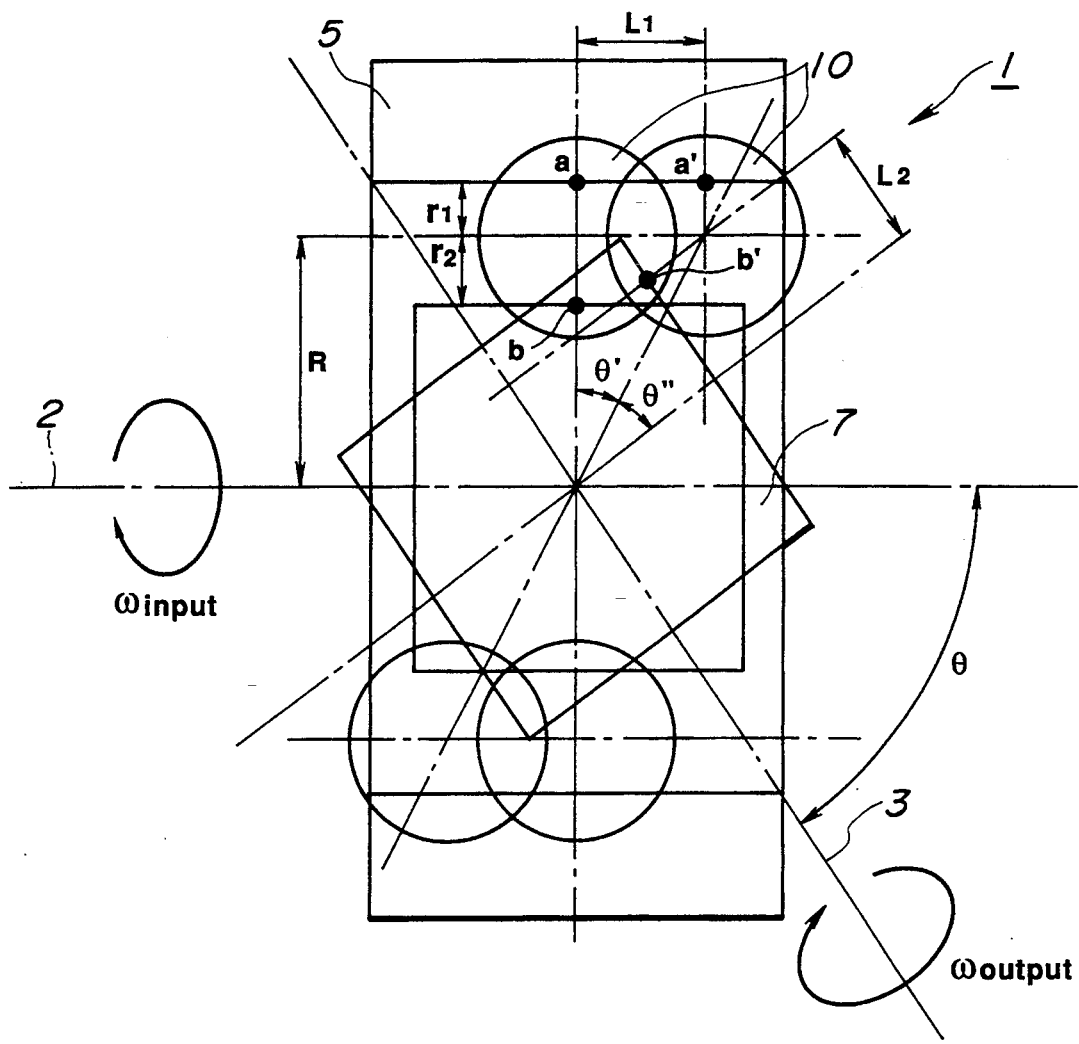
FIG. 2 is an explanatory view for explaining an action exerted when the conventional universal joint shown in FIG. 1 carries out a transmission of torque.
Figure 3:
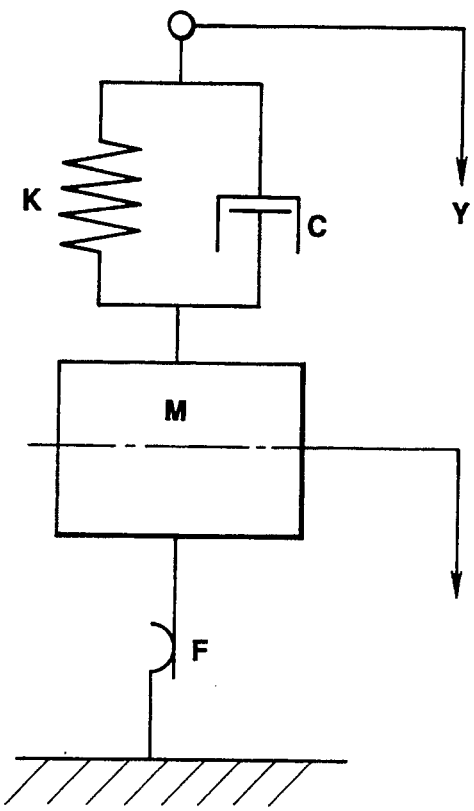
FIG. 3 is an explanatory view of a vibration model representing a mechanical element having a pair of members which carry out a relative harmonic vibration along with a slide motion of the pair of members described in the Background of the Invention.
Figure 7:
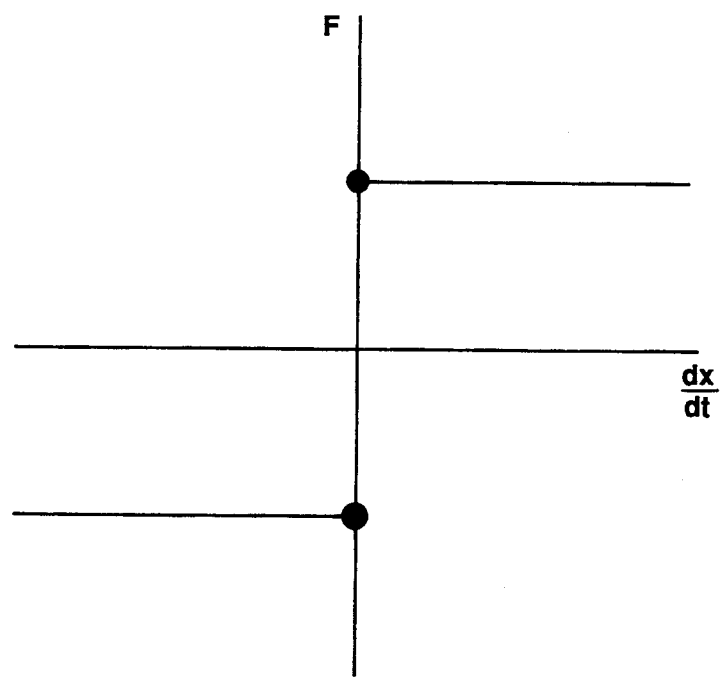
FIG. 7 is a characteristic graph representing a relationship between a velocity dx/dt and a frictional force F applied to the model shown in FIG. 3.

FIGS. 1 through 3 have already been explained in the Background of the Invention.

Figure 4A:
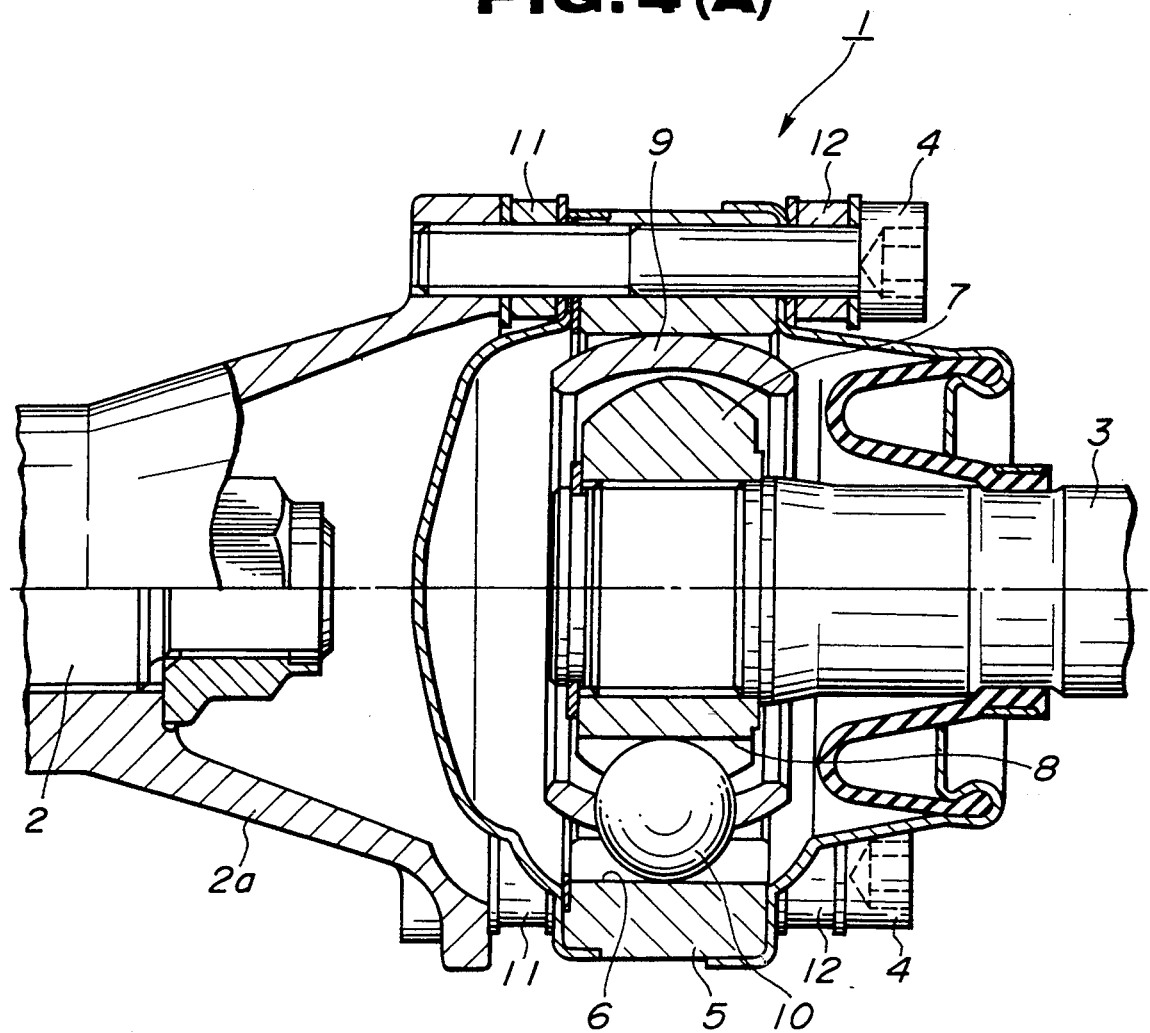
FIG. 4(A) is a cross-sectional view of an essential part of an uniform motion type universal joint in a first preferred embodiment according to the present invention.
Figure 4B:
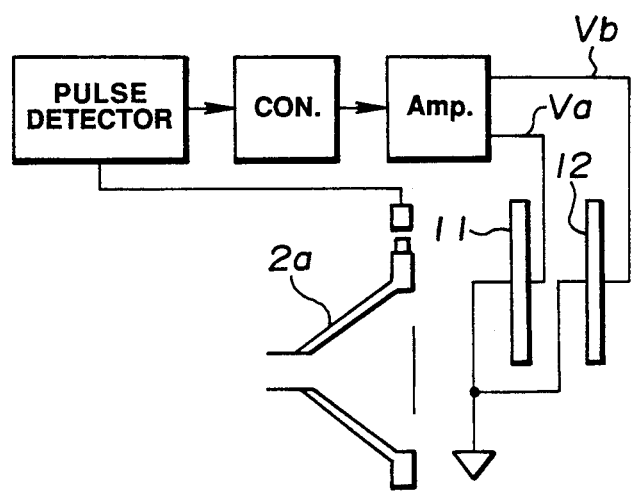
FIG. 4(B) is an electric wiring diagram of the first preferred embodiment shown in FIG. 4(A).
Figure 4C:
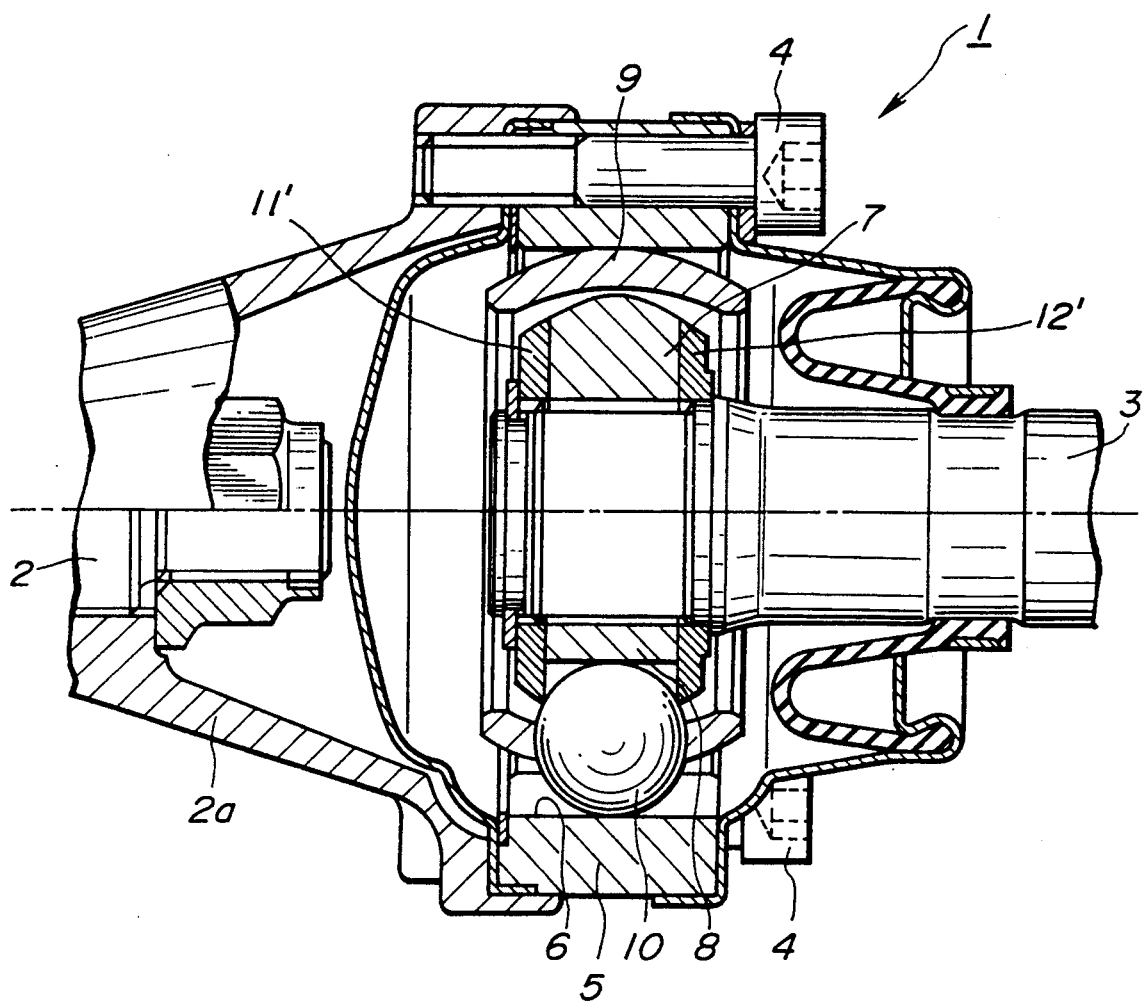
FIGS. 4(C) and 4(D) are explanatory views of modifications of the first preferred embodiment shown in FIGS. 4(A) and 4(B).
Figure 4:
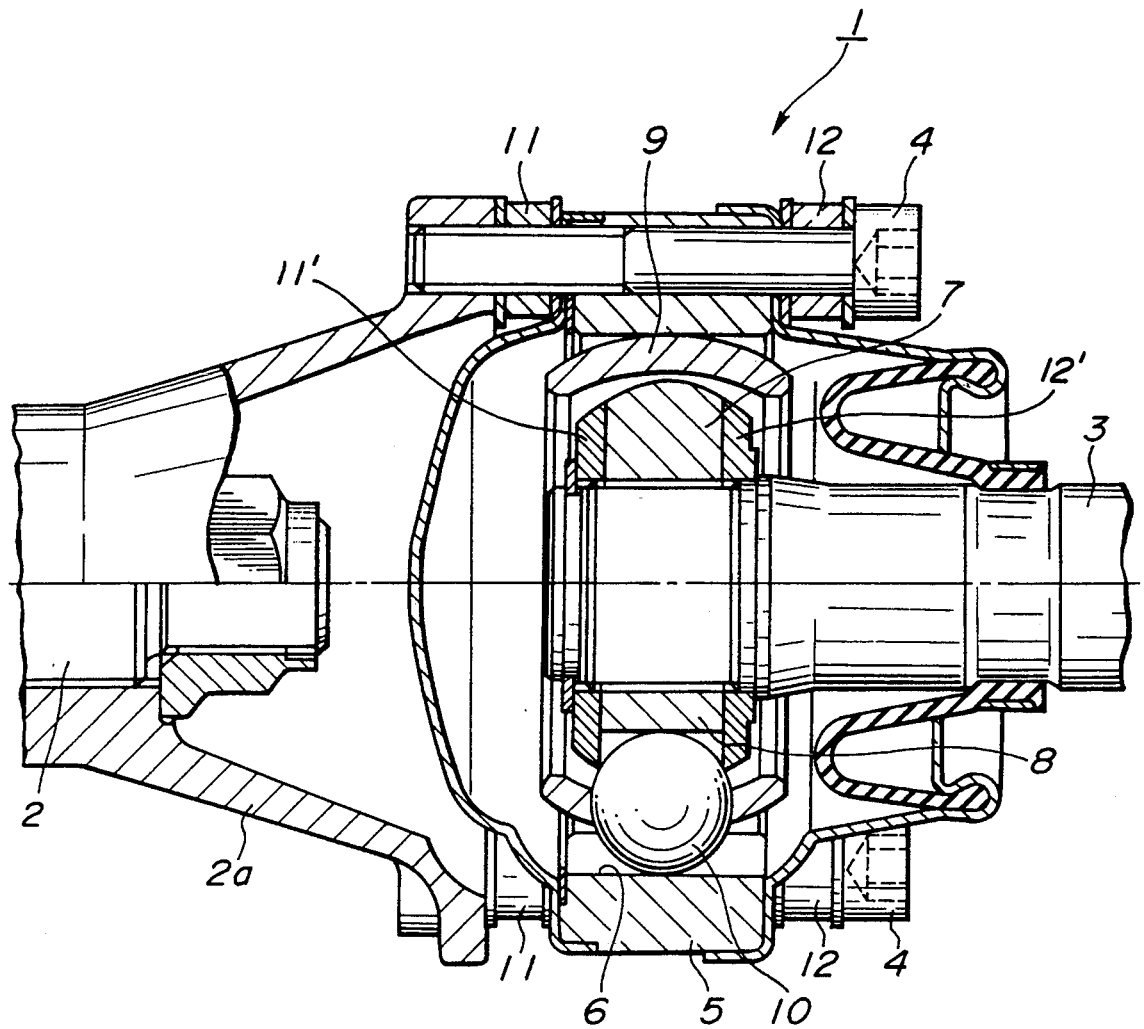

FIGS. 4 and 5 show a first preferred embodiment according to the present invention.

The same reference numerals are used in FIGS. 4 and 5 for the like elements shown in FIG. 1. The universal joint 1 shown in FIG. 4 serves as a universal joint which enables the transmission of a uniform velocity and a smooth rotary motion between rotation axles 2 and 3 irrespective of a joint angle formed therebetween. As shown in FIG. 4, an outer member 5, ball rolling groove 6, inner member 7, a ball rolling groove 8, cage 9, and a ball 10 are included.

In the first preferred embodiment, ring-shaped piezoelectric actuators 11 and 12 are respectively sandwiched between a flange 2a fixed onto one rotational axle 2 and outer member 5 and between a head of a mounting bolt 4 for mounting the outer member 5 onto flange 2a and outer member 5.

The piezoelectric actuators 11 and 12 have inherent characteristics such that their bodies tend to be expanded and constricted according to voltages applied thereacross. In the first preferred embodiment, their expanded and constricted directions are aligned with the axial direction of the rotational axle 2.

In addition, if an engaging force of the mounting bolt 4 is properly adjusted, the piezoelectric actuators 11 and 12 receive preweights in the axial direction, i.e., expanded and constricted directions.

Figure 5A:
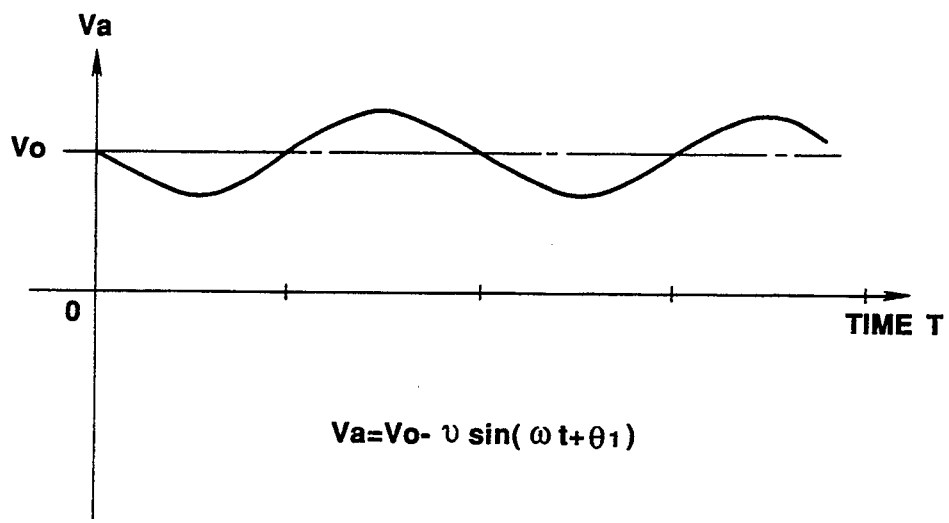
FIGS. 5(A) and 5(B) are waveform charts representing characteristics of voltages applied to piezoelectric actuators shown in FIG. 4(A) and 4(B).
Figure 5B:
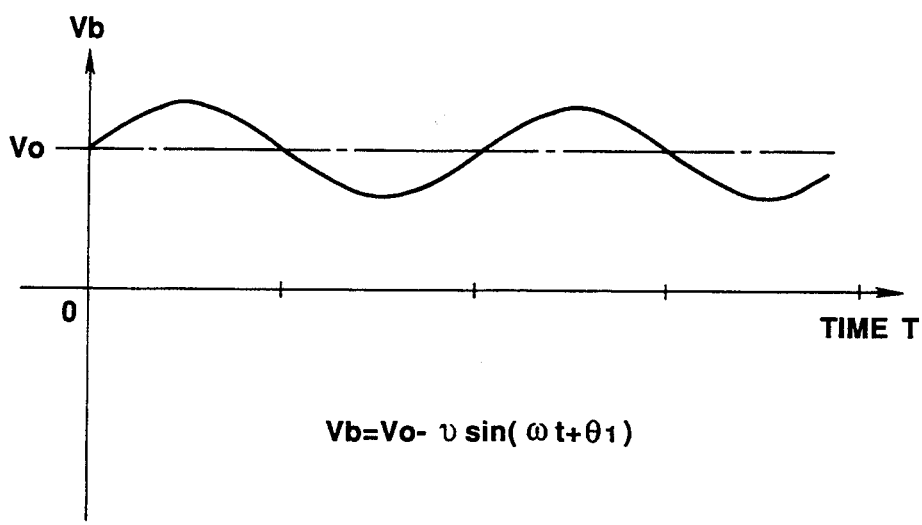

It is noted that the piezoelectric actuators 11 and 12 are connected to a voltage application apparatus, i.e., a voltage amplifier shown in FIG. 4(B) and the voltage application apparatus serves to apply a voltage Va as shown in FIG. 5(A) to the piezoelectric actuator 11 and to apply a voltage Vb as shown in FIG. 5(B), each on the basis of a detection result derived by a rotational phase sensor which detects a rotational phase of the one rotation axle 2. The rotational phase sensor is constituted by, e.g., a magnetic pick up for detecting a change in the magnetic field when a projection installed on a part of an outer peripheral surface of the flange 2a changes position. Then, a pulse detector detects the change in the magnetic field in the form of a pulse and transmits the pulse to a control unit. The control unit then outputs the command to the amplifier to apply the voltages Va and Vb to the actuators 11 and 12 in response to the pulse, as shown in FIG. 4(B), so that the phase of the voltage variation component is at least out of phase with the pulse signal derived by the rotational phase sensor.

These voltages Va and Vb are represented by:

$$Va = Vo - v \cdot \sin(\omega t + \theta 1). \quad (13)$$

$$Vb = Vo + v \cdot \sin(\omega t + \theta 1). \quad (14)$$

In the equations (13) and (14), Vo denotes a prevoltage, v denotes an amplitude of a varied voltage component, and $\theta 1$ denotes a phase. As appreciated from the equations (13) and (14), second sides of the equations (13) and (14) indicate mutually opposite phases in the varied voltage components.

Hence, when one of the piezoelectric actuators 11 and 12 is constricted, the other piezoelectric actuator 11 or 12 is expanded by the same level. The expansion of one piezoelectric actuator means the constriction of the other piezoelectric actuator so that their expansion and constriction are absorbed. Since the expansion and constriction of both piezoelectric actuators are not transmitted to the mounting bolt 4, these actuators 11 and 12 can be expanded and constricted without receiving a large load imposed due to expansion and constriction of the mounting bolt 4 and its expansion and constriction cause the outer member 5 to displace in the axial direction.

In addition, the voltage application apparatus serves to apply the voltages Va and Vb on the basis of the detection result of the rotational phase sensor so that the phase $\theta 1$ of the varied voltage component included in the voltages Va and Vb is different from the rotational phase of the one rotation axle 2.

In the uniform type universal joint 1 shown in FIG. 4(A), a phase in the displacement of the outer member 5 and ball 10 caused by the rotation of the one rotation axle 2 coincides with a phase of applied vibration force generated therebetween and the phase of the displacement coincides with the rotational phase of the one rotation axle 2.

Hence, when the voltages Va and Vb are applied to the piezoelectric actuators 11 and 12 so that each phase $\theta 1$ of the varied voltage component included in the voltages Va and Vb does not synchronize with the rotational phase of the one rotation axle 2 and displacement variation is applied to the outer wheel 5, and a phase of the displacement of the outer member 5 becomes out of phase with that of the input vibration force between the outer member 5 and ball 10.

A generation of high frequency vibration components shown in FIG. 11 can be avoided. That is to say, the high frequency vibration caused by the frictional input vibration force of a slide portion of the universal joint 1 can be suppressed and, consequently, a reduction of noise levels can be achieved.

Although, in the first preferred embodiment, both piezoelectric actuators 11 and 12 are sandwiched between rotation axle 2 and outer member 5 to provide the displacement variation for the outer member 5, the piezoelectric actuators may alternatively be intervened between rotation axle 3 and inner wheel 7, as shown in FIG. 4(C) so that the inner wheel 7 undergoes the displacement variation in the axial direction with respect to the rotation axle 3.

Furthermore, the same effect as in the first preferred embodiment can be achieved when a pair of two piezoelectric actuators 11, 12, 11', and 12' are installed as shown in FIG. 4(D).

Since, in the first preferred embodiment, the axial displacement and input vibration force can be applied to a rotary mechanical element including the universal joint 1, an unbalanced vibration of a rotary component can also be reduced through the axial-displacement and input-vibration-force control in the axial direction.

Figure 6A:
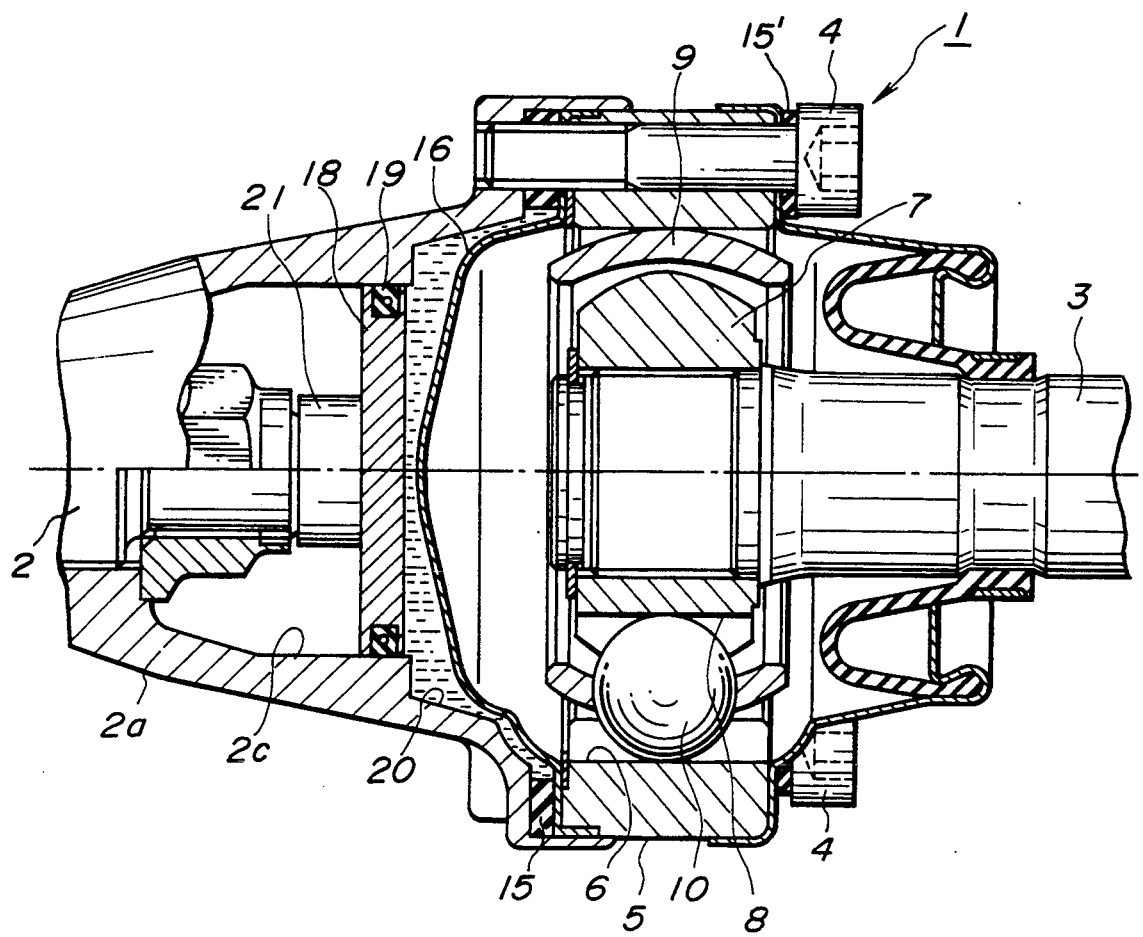
FIG. 6(A) is a cross-sectional view of an essential part of the uniform motion type universal joint in a second preferred embodiment according to the present invention.

FIG. 6(A) shows a second preferred embodiment of the structure of the uniform motion type universal joint according to the present invention.

The same reference numerals shown in FIG. 6(A) represent the corresponding elements shown in FIG. 4(A).

A ring-shaped elastic member 15 is sandwiched between the flange 2a and outer member 5. In addition, another ring-shaped elastic member 15' is sandwiched between the head of the mounting bolt 4 and outer member 5. A suitable pressure is applied so as to seal a space between the flange 2a and outer member 5 by properly fastening the mounting bolt 4. A fastening force of the mounting bolt 4 has a magnitude such that a hermetical seal between the flange 2a and outer member 5 can be assured although when the displacement variation occurs in the outer wheel 5 in the direction of rotation axle 3, the pressure due to the elastic member 15 becomes minor.

An edge portion of a joint cover 16 enclosing an overall opening portion of the flange 2a is sandwiched between the outer member 5 and elastic member 15.

An inner peripheral surface 2c of the flange 2a is formed in a cylindrical shape to constitute a cylinder and a piston 18 is disposed within the inner peripheral surface 2c. An oil seal 19 is installed on an outer peripheral surface of the piston 18.

A fluid chamber 20 is defined in an inner side of the opening end of the flange 2a by a hermetical seal between the elastic member 15, joint cover 16, piston 18, and oil seal 19. A full amount of oil is filled within the fluid chamber 20.

Another piezoelectric actuator 21 is adhered onto both the rotation axle 2 and piston 18. The piezoelectric actuator 21 is intervened between the end of the rotation axle 2 and a surface of the piston 18 and placed so as to face the rotation axle 2 so that its expansion and constriction direction coincides with the axial direction of the rotation axle 2.

The piezoelectric actuator 21 receives the voltage Va shown in FIG. 5(A) of the first preferred embodiment.

When the piezoelectric actuator 21 expands or constricts according to the applied voltage Va, the piston 18 advances or retracts in the axial direction of the rotation axle 2 according to the expansion or constriction of the piezoelectric actuator 21, since the piezoelectric actuator 21 is adhered onto both rotation axle 2 and piston 18.

The advance or retraction of the piston 18 is transmitted to the oil filled in the fluid chamber 20 so that a pressure variation occurs in the fluid chamber 20. However, since the elastic member 15 is sandwiched between the flange 2a and outer member 5, the pressure variation causes the elastic member 15 to be elastically deformed, such that an interval between the flange 2 and outer member 5 is widened or narrowed.

Hence, the displacement variation occurs in the outer member 5. Since the rotational phase of the displacement variation is different from the rotational phase of the rotation axle 2, the phase of the displacement of the outer member 5 deviates from that of the input vibration force between the outer member 5 and ball 10 in the same way as described in the first preferred embodiment. The generation of the high-frequency vibration shown in FIG. 11 is thus avoided. That is to say, the high frequency vibration caused by the frictional input vibration force of a sliding portion of the universal joint denoted by 1 of FIG. 6(A) is suppressed, and reduction of noise level can be achieved.

In the second preferred embodiment, a fluid pressure actuator is constituted by the inner peripheral surface 2c of the flange 2a, elastic member 15, joint cover 16, piston 18, oil seal 19, and piezoelectric actuator 21.

The fluid pressure actuator may be constituted so that the displacement variation occurs in the inner member 7 in the axial direction with respect to the rotation axle 3.

In addition, each of the piezoelectric actuators 11, 12, and 21 may be expanded or constricted at a frequency different from a rotational frequency of the rotation axle 2 since the same effect as those in the first and second preferred embodiments can be achieved.

Figure 6B:
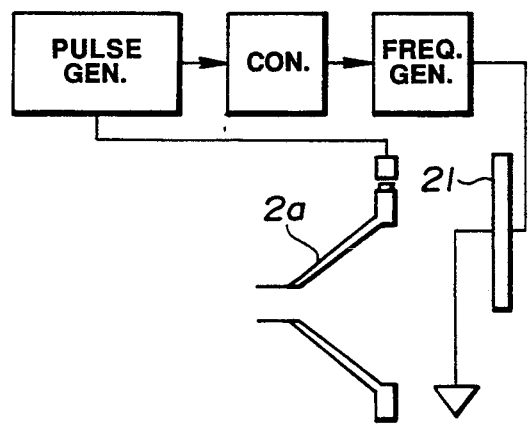
FIG. 6(B) is an electric wiring diagram of a modification of the second preferred embodiment shown in FIG. 6(A).
Figure 8:
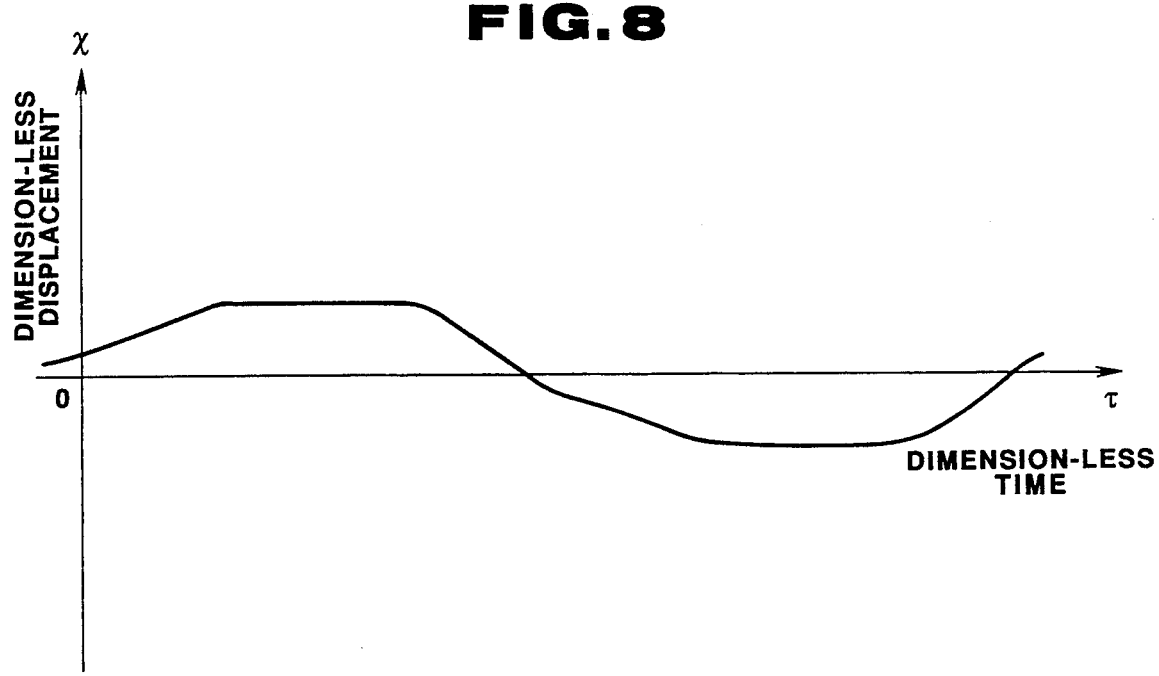
FIG. 8 is a characteristic graph representing a relationship between a dimension-less displacement x and a dimension-less time $\tau$ as a result of simulation carried out in the system shown in FIG. 3.
Figure 9:
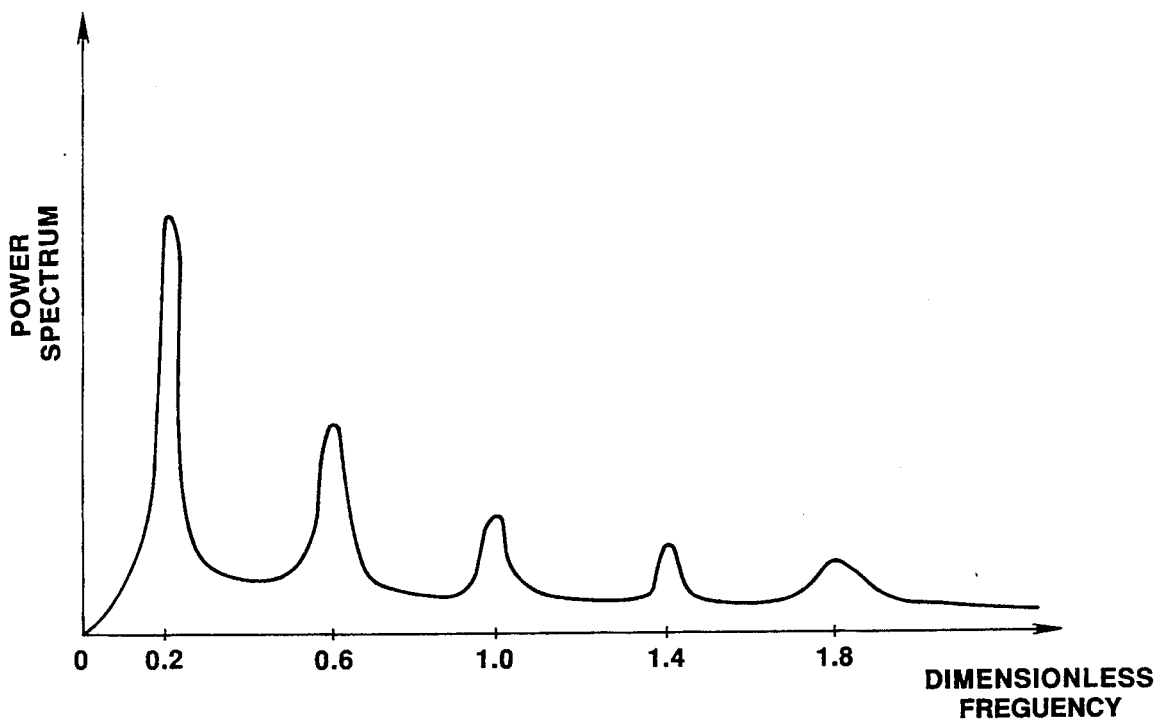
FIG. 9 is a characteristic graph representing a relationship of a power spectrum and a dimension-less frequency as the result of simulation carried out in the system shown in FIG. 3.

FIG. 6(B) shows a modification of the second preferred embodiment in which the piezoelectric actuator 21 is expanded and constricted at a frequency different from the rotation frequency of the rotation axle 2.

This is because if frequencies of expansion and constriction of the piezoelectric actuators 11, 12, and 21 are different from the rotational frequency of the rotation axle 2, a probability of coincidence between the phase of the displacement between the outer member 5 and ball 10 and phase of input vibration force becomes extremely small so that these phases are different at almost all points of time. The same action in each of the embodiments essentially eliminates the generation of high frequency vibration components.

Furthermore, the structure of providing the displacement variation given to the outer member may be arbitrary except those shown in the first and second preferred embodiments.

The present invention can be applied equally well to every mechanical element which is provided with a pair of members that relatively vibrate harmonically along with a sliding motion therebetween. The same effects as those in the first and second preferred embodiments can be achieved by providing means for applying a displacement variation at a phase which is different from that of the input vibrating force due to the harmonic vibration or means for applying a displacement variation at a frequency different from a frequency of the harmonic vibration.

As described hereinabove, according to the present invention, the phase of the displacement in the sliding portion of the mechanical element deviates from that of the input vibrating force, and high frequency vibration due to the frictional force of the sliding portion is not generated.

FIGS. 10(A) through 10(B) show responsive waveforms and waveforms of the dimension-less displacement x and speed component $1/\gamma \cdot (dx/d\tau)$ in a case where the simulation is carried out by means of Runge-Kutta method on the basis of the motion equation expressed by the equation (12).

The results of the simulations shown in FIGS. 10 (A) through 10(B) are as follows:

The attenuation ratio $\xi$ and dimension-less frictional force f are fixed as $\xi=0.1$ and as $f=0.2$. In FIG. 10(A), $\gamma=0.2$, In FIG. 10(B), $\gamma=0.6$. In FIG. 10(C), $\gamma=1.6$.

In addition, one of the waveforms which has a thickness denoted by hatched lines is shown in each of FIGS. 10(A) through 10(C). This thickness waveform denotes a condition band described in the above-identified Japanese paper. As the speed becomes zero in the condition band, the acceleration becomes zero so that a limited time motion itself is halted. Such a phenomenon as described below is generally called a stick-slip phenomenon. In addition, a waveform depicted by a center line within the condition band is equal to the waveform generated by a force caused by the displacement vibration input Y, and the width of the condition band is determined by the magnitude of the frictional force F. Hence, if the frictional force F is not present, the width of the condition band becomes eliminated so as to coincide with the waveform of the force generated by the displacement vibrating force Y.

FIG. 11 shows the result of simulation, i.e., frequency analysis of the response waveform with the dimension-less vibrating frequency $\gamma$ set in a range from 0 to 2.0.

As shown in FIG. 11, as the phases of the dimension-less vibrating force and dimension-less displacement are deviated when the vibrating frequency to the vibration system is increased, the high frequency vibrating component is not generated.

In other words, if the phase of the displacement of the portion at which the frictional force F is generated (the displacement X with respect to a fixed portion denoted by oblique lines in the case of the model shown in FIG. 3) is even slightly deviated from the phase of the vibrating force applied to the vibration system (a force generated due to the displacement input vibrating force Y), high frequency vibration is not generated.

It will fully be appreciated by those skilled in the art that the foregoing description has been made to the preferred embodiments, and various changes and modifications may be made without departing from the scope of the present invention which is to be defined by the appended claims.

What is claimed is:

1. A mechanical device which is operated and is involved in at least one slide motion, comprising:
   a) a pair of cooperative members, one of the pair of cooperative members being at least rolled and slid on the other of the pair of cooperative members in response to an external force exerted on either of the pair of cooperative members, the pair of cooperative members being relatively harmonically vibrated together in response to the external force causing relative harmonic vibrations to both of the pair of cooperative members; and b) means for providing a displacement variation for a portion of one of the pair of cooperative members contacting the other of the pair of cooperative members in a direction of the external force so that a phase of the displacement variation is at least different from a phase of the harmonic vibrations generated due to a frictional force created by the sliding contact between the pair of cooperative members;

wherein the mechanical element is a uniform motion type universal joint having a drive portion and a driven portion operatively connected to each other, said driven portion including a rotation axle, and wherein a first one of the pair of cooperative members comprises an inner joint member which is installed on the rotation axle of the universal joint, the rotation axle serving as a driven axle, and a plurality of balls each installed in a space defined by a second one of the pair of cooperative members includes a plurality of ball rolling grooves installed at a side of the inner joint member;

wherein said displacement variation providing means comprises a sensor for detecting a rotational phase of the rotation axle; first means responsive to an output signal from the sensor for generating a command signal according to the output signal from the sensor; second means for generating a pair of voltages in response to the command signal; and third means installed between the rotation axle and the inner joint member for carrying out the displacement variation between the rotation axle and the inner joint member in a direction which coincides with an axial direction of the rotation axle according to the pair of voltages which are applied thereacross, a phase of each of the pair of voltages being different from the rotation phase of the rotation axle.

2. A mechanical device which is operated and is involved in at least one slide motion, comprising:

a) a pair of cooperative members, one of the pair of cooperative members being at least rolled and slid on the other of the pair of cooperative members in response to an external force exerted on either of the pair of cooperative members, the pair of cooperative members being relatively harmonically vibrated together in response to the external force causing relative harmonic vibrations to both of the pair of cooperative members; and b) means for providing a displacement variation for a portion of one of the pair of cooperative members contacting the other of the pair of cooperative members in a direction of the external force so that a phase of the displacement variation is at least different from a phase of the harmonic vibrations generated due to a frictional force created by the sliding contact between the pair of cooperative members;

wherein the mechanical element is a uniform motion type universal joint having a drive portion and a driven portion operatively connected to each other, said drive portion including a first rotation axle, and wherein a first one of the pair of cooperative members comprises an outer joint member which is installed on the first rotation axle, the first rotation axle serving as a drive axle, and a second one of the pair of cooperative members includes a plurality of balls each installed in a space defined by a plurality of ball rolling grooves installed at a side of the outer joint member;

wherein said driven portion includes a second rotation axle and the mechanical element further comprises an inner joint member installed on the second rotation axle of the universal joint and wherein the second rotation axle serves as a driven axle, and the plurality of balls are each installed in a space defined by a plurality of ball rolling grooves installed at a side of the inner joint member and said displacement variation providing means further comprises a sensor for detecting a rotational phase of the second rotation axle; first means responsive to an output signal from the sensor for generating a command signal according to the output signal from the sensor; second means for generating a pair of voltages in response to the command signal; and third means installed between the second rotation axle and the inner joint member for carrying out the displacement variation between the second rotation axle and the inner joint member in a direction which coincides with an axial direction of the second rotation axle according to the pair of voltages applied thereacross, a phase of each of the pair of voltages being different from the rotation phase of the second rotation axle.

3. A mechanical device which is operated and is involved in at least one slide motion, comprising:

a) a pair of cooperative members, one of the pair of cooperative members being at least rolled and slid on the other of the pair of cooperative members in response to an external force exerted on either of the pair of cooperative members, the pair of cooperative members being relatively harmonically vibrated together in response to the external force causing relative harmonic vibrations to both of the pair of cooperative members; and b) means for providing a displacement variation for a portion of one of the pair of cooperative members contacting the other of the pair of cooperative members in a direction of the external force so that a phase of the displacement variation is at least different from a phase of the harmonic vibrations generated due to a frictional force created by the sliding contact between the pair of cooperative members;

wherein said displacement variation providing means applies a frequency of the displacement variation to the portion of the one of the pair of cooperative members contacting the other of the pair of cooperative members which is different from a frequency of the relative harmonic vibrations;

further comprising a rotation axle having a flange and wherein said displacement variation providing means comprises a joint cover attached to the outer joint member; a ring shaped elastic member installed between an end of the flange of the rotation axle and the joint cover; a piston attached on the flange; an oil seal attached on the piston; an oil chamber defined by the flange, the joint cover, the elastic member, and the piston; a piezoelectric actuator attached between one end of the rotation axle and the piston; a sensor for detecting a rotation frequency of the rotation axle; first means responsive to an output signal of the sensor which indicates the rotation frequency of the rotation axle for generating a command signal according to the output signal of the sensor; second means responsive to the command signal for generating a voltage signal to the piezoelectric actuator so that the piezoelectric actuator carries out the displacement variation for the outer joint member in an axial direction of the rotation axle at the frequency which is different from the rotation frequency of the rotation axle.

4. A uniform motion type universal joint yoke comprising:
   a) first and second rotation axles;
   b) an outer joint member installed on the first rotation axle and having a plurality of ball rolling grooves on its outer peripheral surface;
   c) an inner joint member installed on the second rotation axle and having a plurality of ball rolling grooves on its inner peripheral surface;
   d) a plurality of balls disposed in the ball rolling grooves of the outer and inner joint members for transmitting a torque between the inner and outer joint members;
   e) a cage which holds the plurality of balls and
   f) means for applying a displacement variation to at least one of the inner and outer joint members so that a phase of the displacement variation is at least different from a phase of a vibrating force acting upon and between at least one of 1) each of the plurality of balls and the outer joint member and 2) each of the plurality of balls and the inner joint member; and
   a piston having a wall and wherein said displacement variation applying means includes a piezoelectric actuator installed between one end of the first rotation axle and the wall of the piston constituting a hydraulic actuator for actuating the outer joint member according to an expansion or constriction of the piezoelectric actuator in response to a voltage variation applied across the piezoelectric actuator.

5. A mechanical device which is operated and is involved in at least one slide motion, comprising:
   a) a pair of cooperative members, one of the pair of cooperative members being at least rolled and slid on the other of the pair of cooperative members in response to an external force exerted on either of the pair of cooperative members, the pair of cooperative members being relatively harmonically vibrated together in response to the external force causing relative harmonic vibrations to both of the pair of cooperative members; and
   b) means for providing a displacement variation for a portion of one of the pair of cooperative members contacting the other of the pair of cooperative members in a direction of the external force so that a phase of the displacement variation is at least different from a phase of the harmonic vibrations generated due to a frictional force created by the sliding contact between the pair of cooperative members;
   wherein the mechanical element is a uniform motion type universal joint having a drive portion and a driven portion operatively connected to each other, said drive portion including a first rotation axle, and wherein a first one of the pair of cooperative members comprises an outer joint member which is installed on the first rotation axle, the first rotation axle serving as a drive axle, and a second one of the pair of cooperative members includes a plurality of balls each installed in a space defined by a plurality of ball rolling grooves installed at a side of the outer joint member;
   wherein said displacement variation providing means comprises a sensor for detecting a rotational phase of the first rotation axle; first means responsive to an output signal from the sensor for generating a command signal according to the output signal from the sensor; second means for generating a pair of voltages in response to the command signal; and third means installed between the first rotation axle and the outer joint member for carrying out the displacement variation between the first rotation axle and outer joint member in a direction which coincides with an axial direction of the first rotation axle according to the pair of voltages which are applied thereacross, a phase of each of the pair of voltages being different from the rotation phase of the first rotation axle.

6. A mechanical device as set forth in claim 5, further comprising a mounting bolt having a head, and wherein said first rotation axle has a flange formed thereon and said third means comprises a pair of piezoelectric actuators, one of the piezoelectric actuators installed between the flange of the first rotation axle and the other joint member and the other of the pair of piezoelectric actuators installed between the outer joint member and the head of the mounting bolt such that tightening of the mounting bolt places at least one of said pair of piezoelectric actuators under a predetermined pressure.

7. A mechanical device as set forth in claim 6, wherein said pair of piezoelectric actuators receive the pair of voltages, respectively, as expressed below:

$$Va = V_0 - v \cdot \sin(\omega t + \theta_1)$$

$$Vb = v_0 + v \cdot \sin(\omega t + \theta_1),$$

wherein $V_0$ denotes a prevoltage of DC level, v denotes an amplitude of a varied voltage component, and $\theta_1$ denotes a phase of the varied voltage component which is different from the rotation phase of the first rotation axle.

8. A mechanical device which is operated and is involved in at least one slide motion, comprising:
   a pair of cooperative members, one of the pair of cooperative members being at least rolled and slid on the other of the pair of cooperative members in response to an external force exerted on either of the pair of cooperative members, the pair of cooperative members being relatively harmonically vibrated together in response to the external force causing relative harmonic vibrations to both of the pair of cooperative members; and
   b) means for providing a displacement variation for a portion of one of the pair of cooperative members contacting the other of the pair of cooperative members in a direction of the external force so that a phase of the displacement variation is at least different from a phase of the harmonic vibrations generated due to a frictional force created by the sliding contact between the pair of cooperative members;
   wherein the mechanical element is a uniform motion type universal joint having a drive portion and a driven portion operatively connected to each other, said drive portion including a first rotation axle, and wherein a first one of the pair of cooperative members comprises an outer joint member which is installed on the first rotation axle, the first rotation axle serving as a drive axle, and a second one of the pair of cooperative members includes a plurality of balls each installed in a space defined by a plurality of ball rolling grooves installed at a side of the outer joint member;

wherein said rotation axle has a flange and said displacement variation providing means comprises a joint cover attached to the outer joint member; a ring shaped elastic member installed between an end of the flange of the rotation axle and the joint cover; a piston attached on the flange; an oil seal attached on the piston; an oil chamber defined by the flange, the joint cover, the elastic member, and the piston; and a piezoelectric actuator attached between an end of the first rotation axle and the piston.

9. A mechanical element as set forth in claim 8, wherein said displacement variation providing means further comprises a sensor for detecting a rotation phase of the first rotation axle; first means responsive to an output signal of the sensor which indicates the rotation phase of the first rotation axle for generating a command signal according to the output signal of the sensor; second means responsive to the command signal for generating a voltage signal to the piezoelectric actuator so that the piezoelectric actuator carries out the displacement variation for the outer joint member in an axial direction of the one rotation axle.

10. A uniform motion type universal joint yoke comprising:

a) first and second rotation axles;

b) an outer joint member installed on the first rotation axle and having a plurality of ball rolling grooves on its outer peripheral surface;

c) an inner joint member installed on the second rotation axle and having a plurality of ball rolling grooves on its inner peripheral surface;

d) a plurality of balls disposed in the ball rolling grooves of the outer and inner joint members for transmitting a torque between the inner and outer joint members;

e) a cage which holds the plurality of balls and f) means for applying a displacement variation to at least one of the inner and outer joint members so that a phase of the displacement variation is at least different from a phase of a vibrating force acting upon and between at least one of 1) each of the plurality of balls and the outer joint member and 2) each of the plurality of balls and the inner joint member;

a mounting bolt having a head, and wherein said first rotation axle include a flange, and said displacement variation applying means includes a pair of piezoelectric actuators one of them being installed between one end of the flange and one side wall of the outer joint member, and the other of them being installed between the head of the mounting bolt and the outer joint member, the mounting belt mounting the outer joint member onto the flange of the first rotation axle.

11. A uniform motion type universal joint yoke as set forth in claim 10, wherein said displacement variation applying means includes another pair of piezoelectric actuators, one of them being installed on one side end of the inner joint member and the other of them being installed on an other side end of the inner joint member.

* * * * *